United States Patent
Henry

(10) Patent No.: US 10,650,311 B2
(45) Date of Patent: May 12, 2020

(54) SUGGESTING RESOURCES USING CONTEXT HASHING

(71) Applicant: ASAPP, INC., New York, NY (US)

(72) Inventor: Shawn Henry, Brooklyn, NY (US)

(73) Assignee: ASAAP, INC., New York, NY (US)

( * ) Notice: Subject to any disclaimer, the term of this patent is extended or adjusted under 35 U.S.C. 154(b) by 259 days.

(21) Appl. No.: 15/383,603

(22) Filed: Dec. 19, 2016

(65) Prior Publication Data

US 2018/0174037 A1 Jun. 21, 2018

(51) Int. Cl.
| | |
|---|---|
| *G06N 3/08* | (2006.01) |
| *G06Q 30/00* | (2012.01) |
| *G06F 16/31* | (2019.01) |
| *G06F 16/335* | (2019.01) |
| *G06F 16/338* | (2019.01) |
| *G06F 16/332* | (2019.01) |
| *G06N 3/04* | (2006.01) |
| *H04L 12/58* | (2006.01) |

(52) U.S. Cl.
CPC ............ *G06N 3/08* (2013.01); *G06F 16/325* (2019.01); *G06F 16/335* (2019.01); *G06F 16/338* (2019.01); *G06F 16/3322* (2019.01); *G06N 3/0445* (2013.01); *G06N 3/0454* (2013.01); *G06Q 30/016* (2013.01); *H04L 51/18* (2013.01)

(58) Field of Classification Search
None
See application file for complete search history.

(56) References Cited

U.S. PATENT DOCUMENTS

| | | | |
|---|---|---|---|
| 5,195,034 A | 3/1993 | Garneau et al. | |
| 5,227,971 A | 7/1993 | Nakajima et al. | |
| 5,369,575 A | 11/1994 | Lamberti et al. | |
| 6,173,279 B1 | 1/2001 | Levin et al. | |
| 6,381,645 B1 | 4/2002 | Sassin et al. | |
| 6,453,292 B2 | 9/2002 | Ramaswamy et al. | |
| 6,915,254 B1* | 7/2005 | Heinze .................... | G06F 17/27 382/225 |
| 6,981,040 B1 | 12/2005 | Konig et al. | |
| 7,644,057 B2 | 1/2010 | Nelken et al. | |
| 8,156,138 B2 | 4/2012 | Kohn et al. | |

(Continued)

OTHER PUBLICATIONS

U.S. Appl. No. 15/254,008, filed Sep 1, 2016, Pending.

(Continued)

*Primary Examiner* — Kakali Chaki
*Assistant Examiner* — Michael Zidanic
(74) *Attorney, Agent, or Firm* — GTC Law Group PC & Affiliates

(57) ABSTRACT

A first user and a second user may exchange messages during a session and the exchanged messages may be processed to suggest resources to the first user. For example, the first user may be a customer service representative assisting a customer, and the suggested resources may include text of a message to send to the customer. The resources may be suggested by computing a semantic representation of the messages in the session, computing a context vector that describes a context of the session, computing a context hash vector from the context vector, and retrieving one or more resources from a data store of resources using the context hash vector. Information about a resource may be presented to the first user to assist the first user in responding to the second user.

20 Claims, 12 Drawing Sheets

(56) References Cited

U.S. PATENT DOCUMENTS

| | | | |
|---|---|---|---|
| 8,271,403 | B2 | 9/2012 | Rieck et al. |
| 8,577,671 | B1 | 11/2013 | Barve et al. |
| 8,626,509 | B2 | 1/2014 | Roy et al. |
| 9,336,269 | B1 | 5/2016 | Smith et al. |
| 9,715,496 | B1 | 7/2017 | Sapoznik et al. |
| 9,805,371 | B1 | 10/2017 | Sapoznik et al. |
| 9,807,037 | B1 | 10/2017 | Sapoznik et al. |
| 2003/0033288 | A1 | 2/2003 | Shanahan et al. |
| 2005/0105712 | A1 | 5/2005 | Williams et al. |
| 2005/0228790 | A1 | 10/2005 | Ronnewinkel et al. |
| 2006/0112127 | A1* | 5/2006 | Krause .............. G06F 8/75 |
| 2006/0173776 | A1 | 8/2006 | Shalley et al. |
| 2007/0094217 | A1 | 4/2007 | Ronnewinkel et al. |
| 2007/0100618 | A1 | 5/2007 | Lee et al. |
| 2007/0168448 | A1* | 7/2007 | Garbow .............. H04L 12/1831 709/207 |
| 2008/0091435 | A1 | 4/2008 | Strope et al. |
| 2008/0168070 | A1 | 7/2008 | Naphade et al. |
| 2011/0082825 | A1 | 4/2011 | Sathish et al. |
| 2011/0286596 | A1 | 11/2011 | Gressel et al. |
| 2011/0314012 | A1 | 12/2011 | Kenthapadi et al. |
| 2012/0005515 | A1* | 1/2012 | Reddi .............. G06F 1/28 713/340 |
| 2012/0053945 | A1 | 3/2012 | Gupta et al. |
| 2013/0166485 | A1 | 6/2013 | Hoffmann et al. |
| 2013/0317808 | A1 | 11/2013 | Kruel et al. |
| 2014/0075004 | A1 | 3/2014 | Van Dusen et al. |
| 2014/0282138 | A1 | 9/2014 | Hopton et al. |
| 2014/0297281 | A1 | 10/2014 | Togawa et al. |
| 2014/0317030 | A1 | 10/2014 | Shen et al. |
| 2014/0330818 | A1 | 11/2014 | Raina et al. |
| 2015/0006143 | A1 | 1/2015 | Skiba et al. |
| 2015/0032724 | A1 | 1/2015 | Thirugnanasundaram et al. |
| 2015/0052002 | A1 | 2/2015 | Welch et al. |
| 2015/0142704 | A1 | 5/2015 | London |
| 2015/0215624 | A1 | 7/2015 | Wei |
| 2015/0228275 | A1 | 8/2015 | Watanabe et al. |
| 2015/0310377 | A1 | 10/2015 | Duval et al. |
| 2015/0363393 | A1 | 12/2015 | Williams et al. |
| 2015/0365387 | A1 | 12/2015 | Good |
| 2016/0092688 | A1* | 3/2016 | Wolrich .............. G06F 21/72 713/190 |
| 2016/0163311 | A1 | 6/2016 | Crook et al. |
| 2016/0163314 | A1 | 6/2016 | Fujii et al. |
| 2016/0180151 | A1* | 6/2016 | Philbin .............. G06K 9/00288 382/118 |
| 2016/0182672 | A1 | 6/2016 | Kuperman et al. |
| 2016/0247068 | A1 | 8/2016 | Lin |
| 2016/0364522 | A1* | 12/2016 | Frey .............. G06F 19/22 |
| 2017/0011279 | A1* | 1/2017 | Soldevila .............. G06K 9/66 |

OTHER PUBLICATIONS

U.S. Appl. No. 15/254,041, filed Sep 1, 2016, Pending.
U.S. Appl. No. 15/254,061, filed Sep 1, 2016, Pending.
U.S. Appl. No. 15/254,086, filed Sep 1, 2016, Pending.
U.S. Appl. No. 15/254,101, filed Sep 1, 2016, Pending.
PCT/US2016/049896, Sep. 1, 2016, Pending.
U.S. Appl. No. 15/383,707, filed Dec 19, 2016, Pending.
"Scikit-learn: Machine Learning in Python", scikit-learn 0.17.1 documentation, http://scikit-learrn.org/stable/ (accessed on Sep. 20, 2016), 3 pages.
Al-Rfou, et al., "Conversational Contextual Cues: The Case of Personalization and History for Response Ranking", CoRR abs/1606.00372, http://arxiv.org/abs/1606.00372, 2016, 10 pages.
Bahdanau, et al., "Neural Machine Translation by Jointly Learning to Align and Translate", CoRR abs/1409.0473, http://arxiv.org/abs/1409.0473, 2014, 15 pages.
Bengio, et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.
Brown, et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).
Carrier, et al., "LSTM Networks for Sentiment Analysis", http://deeplearning.net/tutorial/lstm.html, accessed on Sep. 20, 2016, 5 pages.
Chen, "An empirical investigation of sparse log-linear models for improved dialogue act classification.", 2013 IEEE International Conference on Acoustics, Speech and Signal Processing. IEEE, 2013, pp. 1-6.
Courbariaux, et al., "BinaryConnect: Training Deep Neural Networks with binary weights during propagations", CoRR, accessed at https://arxiv.org/pdf/1511.00363v3.pdf, 2015 (Jan. 3, 2017), 9 pages.
Gong, et al., "Iterative Quantization: A Procrustean Approach to Learning Binary Codes", CVPR 2011, accessed at http://www.cs.unc.edu/~lazebnik/publications/cvpr11_small_code.pdf, 2011 (accessed on Jan. 3, 2017), pp. 317-824.
Hochreitner, et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.
Ji, et al., "An Information Retrieval Approach to Short Text Conversation", CoRR, accessed at https://arxiv.org/pdf/1408.6988v1.pdf, Aug. 29, 2014 (accessed on Jan. 3, 2017), 21 pages.
Karpathy, "The Unreasonable Effectiveness of Recurrent Neural Networks", http://karpathy.github.io/2015/05/21/rnn-effectiveness!, (accessed on Sep. 20, 2016), May 21, 2015, 42 pages.
Kim, et al., "Character-Aware Neural Language Models", CoRR abs/1508.06615, http://arxiv.org/abs/1508.06615, 2015, 9 pages.
Kim, "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.
Lai, et al. "Recurrent Convolutional Neural Networks for Text Classification", AAAI'15 Proceedings of the Twenty-Ninth AAAI Conference on Artificial Intelligence, 2015, pp. 2267-2273.
Lai, et al., "Simultaneous Feature Learning and Hash Coding with Deep Neural Networks", CoRR, accessed at http://www.cv-foundation.org/openaccess/content_cvpr_2015/papers/Lai_Simultaneous_Feature_Leaning_2015_CVPR_paper.pdf, 2015 (accessed Jan. 3, 2017), pp. 3270-3278.
Larochelle, et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.
Lee, et al., "Robust Dialog Management with N-best Hypotheses Using Dialog Examples and Agenda", Proceedings of ACL-08: HLT, Columbus, Ohio, Jun. 2008, pp. 630-637.
Levy, et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, pp. 2177-2185.
Li, et al., "A Hierarchical Neural Autoencoder for Paragraphs and Documents", Proceedings of the 53rd Annual Meeting of the Association for Computational Linguistics and the 7th International Joint Conference on Natural Language Processing, Beijing, China, http://web.stanford.edu/~jurafsky/pubs/P15-1107.pdf, Jul. 26-31, 2015 (accessed on Jan. 3, 2017), pp. 1106-1115.
Miao, et al., "Neural Variational Inference for Text Processing", CoRR abs/1511.06038, http://arxiv.org/abs/1511.06038, 2015, 15 pages.
Mikolov, et al., "Distributed Representations of Words and Phrases and their Compositionality", CoRR abs/1310.4546, http://arxiv.org/abs/1310.4546, 2013, 9 pages.
Mikolov, et al., "Distributed Representations ofWords and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.

(56) References Cited

OTHER PUBLICATIONS

Mikolov, et al., "Recurrent neural network based language model", Interspeech 2010, Sep. 26-30, 2010, Makuhari, Chiba, Japan, 2010, pp. 1045-1048.

Mikolov, et al., "Recurrent neural network based language model", INTERSPEECH 2010, Makuhari, Chiba, Japan, accessed at http://www.fit.vutbr.cz/research/groups/speech/publi/2010/mikolov_interspeech2010_IS100722.pdf, Sep. 26-30, 2010 (accessed on Jan 3, 2017), pp. 1045-1048.

Rush, et al., "Optimal Beam Search for Machine Translation", Proceedings of EMNLP 2013, Oct. 18-21, 2013, Seattle, Washington, USA, 2013, 12 pages.

Shi, et al., "Contextual spoken language understanding using recurrent neural networks.", 2015 IEEE International conference on Acoustics, Speech and Signal Processing (ICASSP). IEEE, 2015, pp. 5271-5275.

Sutskever, et al., "Sequence to Sequence Learning with Neural Networks", CoRR abs/1409.3215, http://arxiv.org/abs/1409.3215, 2014, 9 pages.

Tai, et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.

Vinyals, et al., "A Neural Conversational Model", CoRR abs/1506.05869, http://arxiv.org/abs/1506.05869, 2015, 8 pages.

Zhang, et al., "Character-level Convolutional Networks for Text Classification", CoRR abs/1509.01626, http://arxiv.org/abs/1509.01626, 2015, 9 pages.

Chen, et al., "An empirical investigation of sparse log-linear models for improved dialogue act classification", 2013 IEEE International Conference n. Acoustics. Speech and Signal Processing. IEEE., 2013, 6 pages.

PCT/US2016/049896, "Application Serial No. PCT/US2016/049896, International Search Report and the Written Opinion dated May 19, 2017", 14 pages.

PCT/US2017/040205, "Application Serial No. PCT/US2017/040205, International Search Report and the Written Opinion dated Sep. 15, 2017", 11 pages.

U.S. Appl. No. 15/638,543, filed Jun. 30, 2017, Pending.

PCT/US2017/040205, Jun. 30, 2017, Pending.

* cited by examiner

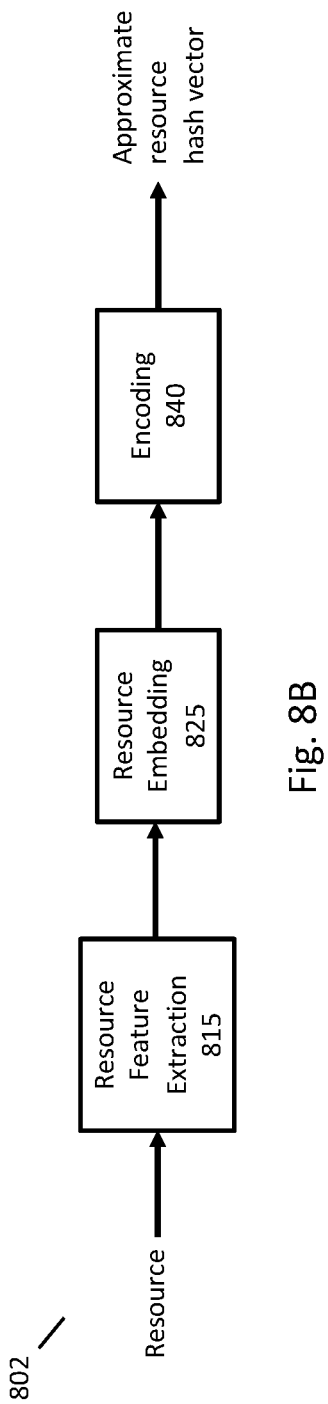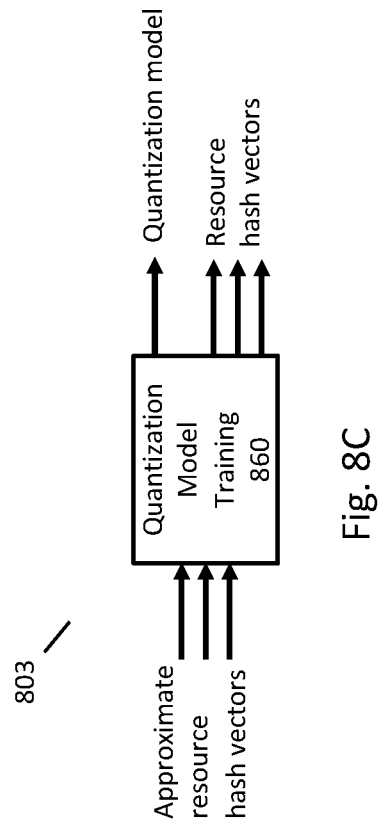
Fig. 8B
Fig. 8C

SUGGESTING RESOURCES USING CONTEXT HASHING

FIELD OF THE INVENTION

The present invention relates to assisting communications using semantic processing.

BACKGROUND

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter.

Some existing techniques for allowing customers to interact with companies may be a nuisance to the customer. Navigating to the right page on a website or an app or navigating a voice menu on a phone call may be time consuming. Some existing techniques for allowing customers to interact with companies may be expensive for a company to implement. Hiring customer service representatives to manually respond to requests and answer phone calls may be a significant expense. For at least these reasons, customer support facilities may not currently satisfy customer needs or may be expensive for the company to operate. Therefore, techniques for improving company interactions with customers is needed.

BRIEF DESCRIPTION OF THE FIGURES

The invention and the following detailed description of certain embodiments thereof may be understood by reference to the following figures:

FIGS. 8A, 8B, and 8C are example systems for training a model for suggesting resources using hash vectors.

DETAILED DESCRIPTION

Described herein are techniques for suggesting resources based on a context of interactions between two entities. Although the techniques described herein may be used for a wide variety of entities and interactions, for clarity of presentation, an example of a customer service representative of a company providing a response to a request of a customer will be used. The techniques described herein, however, are not limited to customers and companies, responses may be provided to requests from users who are not customers, and responses may be from an entity that is not a company, such as an individual. For instance, the interactions may be between an online instructor and a student, a contractor and specialists, an online publisher and commenters, and the like. The interactions may include text messages sent from one entity to another, but are not limited to text messages. For instance, interactions may be through social media channels, telephone communications, online interactions, and the like. One skilled in the art will appreciate that the techniques described herein may be used in a broad scope of interaction environments.

Figure 1:
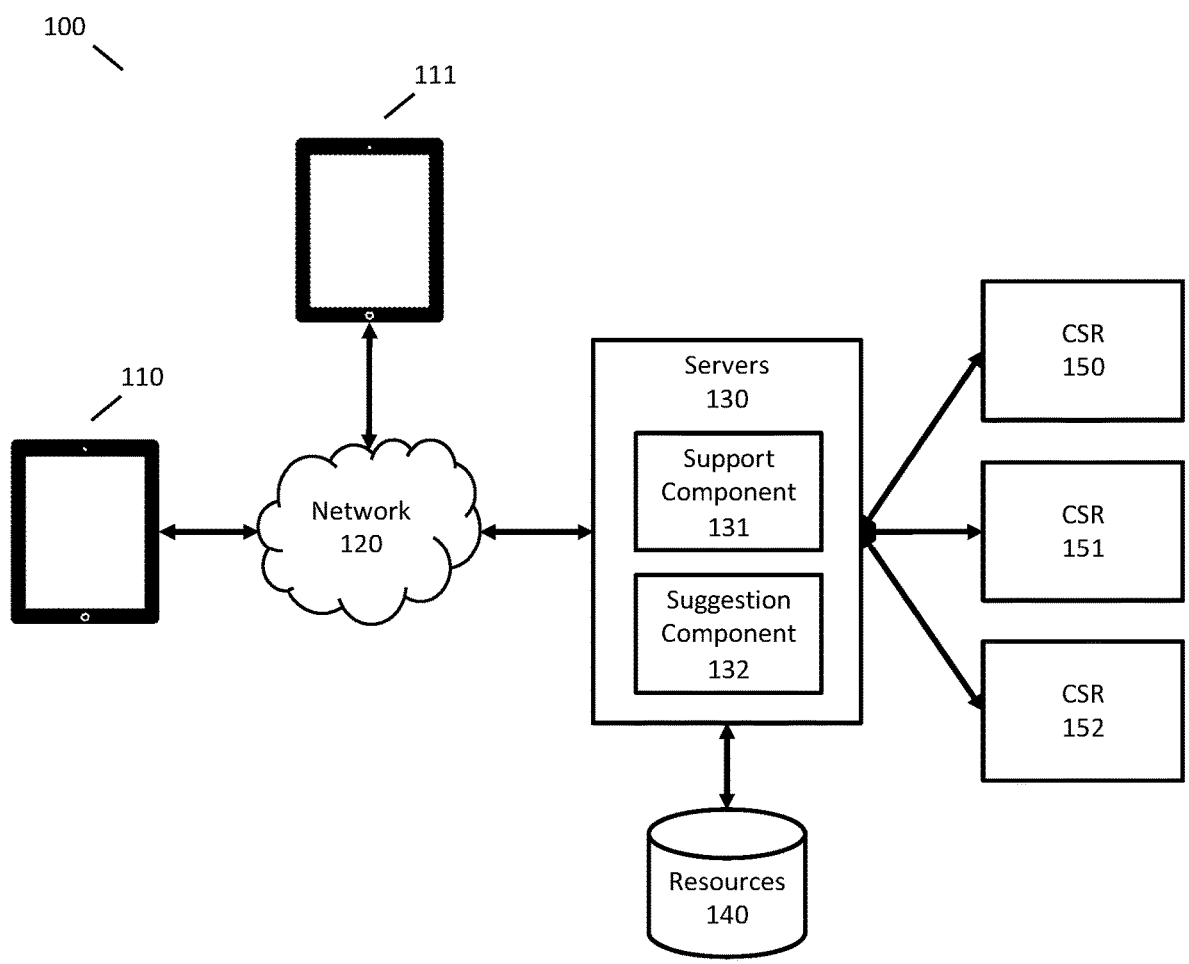
FIG. 1 is an example system for suggesting resources to a customer service representative for responding to a customer.

FIG. 1 illustrates a system 100 for suggesting a resource to a customer service representative in responding to a request of a customer. In FIG. 1, a customer may use customer device 110 to communicate with a company. Customer device 110 may include any appropriate device, such as a computer, smart phone, tablet, wearable device, or Internet of things device. The customer may submit the request using any appropriate techniques, such as typing or speaking a request to an app running on customer device 110 (e.g., an app of a particular company or a third-party app created for processing customer requests), typing or speaking a request on a web page, sending a text message, or sending an email. As used herein, a text message includes any message sent as text including but not limited to a message sent using SMS (short message service) or a special purpose application (e.g., Facebook messenger, Apple iMessage, Google Hangouts, or WhatsApp). Other customers may also interact with system 100, such as another customer using customer device 111.

The customer's request may be sent by customer device 110 to servers 130 of the company via network 120. Network 120 may include any appropriate networks, such as a local area network, a wide area network, the Internet, Wi-Fi, or a cellular data network. The request may be sent using any appropriate transmission protocols that include sending one or more of the text of the message or audio of the customer speaking the request. Where the customer speaks a request to customer device 110, speech recognition may be performed by customer device 110, at servers 130, or by another component of system 100.

Servers 130 receive the customer request and may coordinate further processing of the customer request. Servers 130 may include components comprising particular functionality or may be connected to other computing devices that include such components. For example, servers 130 may include support component 131 that facilitates a customer support session between a customer and a customer service representative (CSR). For example, support component 131 may select a CSR (e.g., CSR 150, 151, or 152), may transmit a message from a customer to a selected CSR, and may transmit a response from a CSR back to the customer. A CSR may use a user interface, such as an application on a computer or a web page, to receive customer requests and provide responses to them.

Servers 130 may include suggestion component 132 to suggest resources to a CSR in responding to a request of a customer. For example, suggestion component 132 may process messages and other information (e.g., images or URLs) transmitted between customer 110 and the CSR to determine a context of the session. A context of session may be any representation of a description of interactions between the customer and the CSR. For example, a context may be a vector computed using an artificial neural network that describes a meaning of the interactions. An interaction may include any information or data transmitted between the customer and the CSR. For example, a message is an example of an interaction. Suggestion component 132 may retrieve one or more resources from resources data store 140 and present information about the resources to the CSR to assist the CSR in responding to the customer. The suggested resources may include any information that may assist a CSR in responding to a customer. For example, the resources may include a text response (such as a text response used by the current CSR or another CSR in a previous support session similar to the current support session), an image, a URL to relevant information, a document, or a trouble shooting tree that may be used by the CSR for diagnosing problems.

Figure 2:
FIG. 2 is an example of a user interface for a customer service representative for responding to a customer.

The suggested resources may be presented on a user interface (UI) used by the CSR, such as the user interface of FIG. 2. The UI of FIG. 2 includes different portions that contain different types of information. For example, FIG. 2 includes a customer list portion 210 that includes a list of customers who the CSR is currently communicating with. In this example, the CSR is communicating with five different customers, and the customer named Cathy Washington is a selected or active customer. FIG. 2 also includes a conversation portion 220 that shows messages between the customer and the CSR.

FIG. 2 also includes a suggestions portion 230 that may present suggested resources to the CSR. In this example the suggested resources include three text responses 241-243, a URL 250, and a document 260. The CSR may use any of the suggestions by selecting them or using any other appropriate user interface techniques. For example, the CSR could click suggested response 241 to have it inserted into the text entry box of conversation portion, and then send it to the customer. Similarly, the CSR may select URL 250 or document 260 to send them to the customer or to view them.

Figure 3:
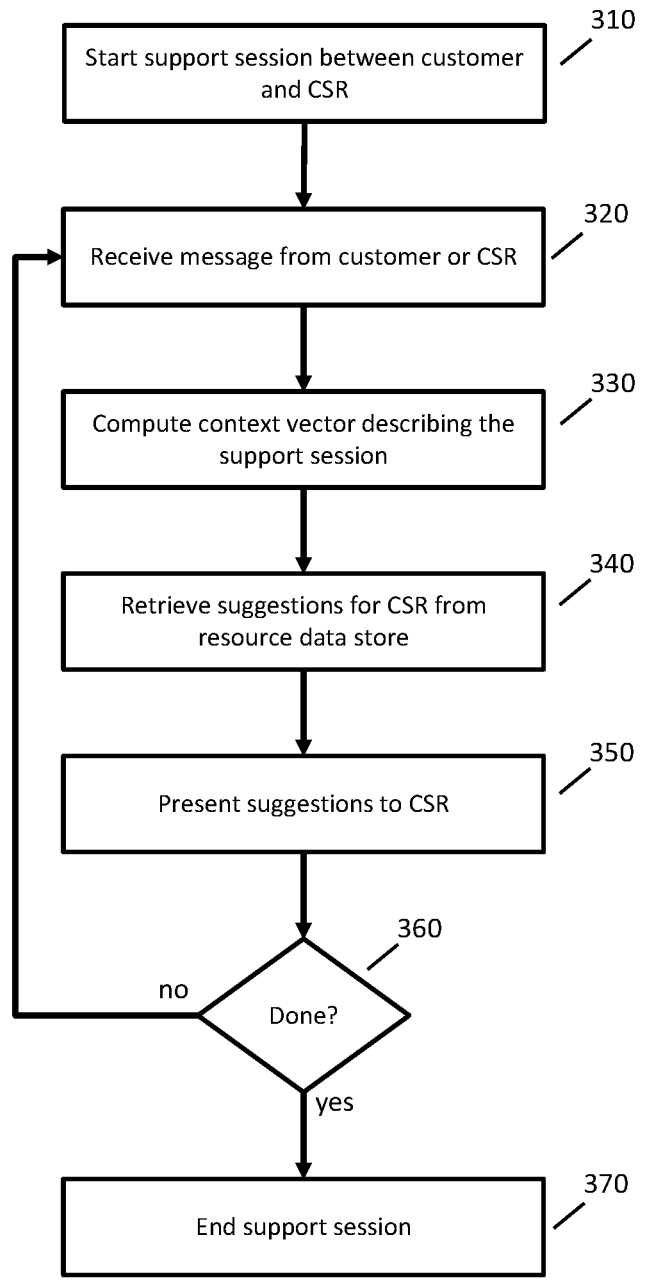
FIG. 3 is a flowchart of an example implementation of suggesting a resource to a customer service representative using a context of a session.

FIG. 3 is a flowchart of an example implementation of suggesting resources to a CSR. In FIG. 3, the ordering of the steps is exemplary and other orders are possible, not all steps are required and, in some implementations, some steps may be omitted or other steps may be added. The process of the flowcharts may be implemented, for example, by any of the computers or systems described herein.

At step 310, a support session between a customer and a CSR is started. The support session may be started using any appropriate techniques, such as by sending a text message (e.g., SMS), sending an email message, using an application or app (e.g., Facebook or a company specific app), or using a webpage. The session may be started by either the customer or the CSR, and they may communicate via text, voice, or other means of interactive communication. A support session may comprise any number of interactions between the customer and the CSR.

At step 320, a message is received from either the customer or the CSR and transmitted to the other. For example, where the message is text, the text of messages between the customer and CSR may be presented in user interfaces to the customer and the CSR. Where the message is audio, automatic speech recognition may be used to convert the audio to text for subsequent processing.

At step 330, a context vector is computed that describes the interactions in the support session, as described in greater detail below. For example, a context vector may be computed by iteratively processing messages between the customer and the CSR. After receiving a message from the customer or CSR, a previous context vector may be updated using the message to generate a new context vector that accounts for the received message. A context vector need not be in the form of a vector and may take other formats, such as a matrix or tensor. A context vector may include any data that describes the interactions so far between the customer and the CSR, such as a vector that indicates a semantic meaning of the interactions.

At step 340, suggestions of resources for the CSR are obtained from a data store of resources using the context vector. For example, resources may be retrieved from the data store that have corresponding resource vectors that are an exact match to the context vector or that are close to the context vector (e.g., using a Euclidean or Hamming distance). The resources in the data store may include any resources that may assist the CSR. For example, the resources data store may include a large number of messages previously sent by CSRs to customers, and the context vector may be used to receive one or more previous messages that may be an appropriate response for the CSR to send to the customer. The resources in the resources data store may also include any of the other resources described above, such as images, documents, or URLs.

At step 350, suggestions are presented to the CSR using the resources retrieved from the resources data store at step 340. For example, where the resources are previous messages, the text of the messages may be presented to the CSR. Where the resources are images, a thumbnail of the image may be presented along with a short description of the image. The CSR may then use the suggestions in responding to the customer. In some situations, the CSR may not use the suggestions at all and type or speak a response to the customer. In some situations, the CSR may click on a suggestion to send a response to the customer, such as by clicking a suggested message to send that same message to the customer.

At step 360, it is determined if the session is done. For example, the session may be terminated by either the customer or the CSR. If the session is not done, then processing proceeds to step 320 where another message is received from the customer or the CSR. A new context vector may then be computed using that message, resources may be retrieved from a data store using the new context vector, and suggestions may be presented to the CSR using the retrieved resources. If the session is done, then processing proceeds to step 370 where the support session is ended. For example, a connection between the customer and CSR may be terminated so that messages are no longer communicated between them.

The context vector computed during the processing of FIG. 3 may be created by processing the received message using one or more mathematical models, such as a neural network model. Mathematical models for creating context vectors may be trained by using a corpus of training data.

For example, a corpus of training data may include data about previous support sessions between customers and CSRs.

Figure 4:
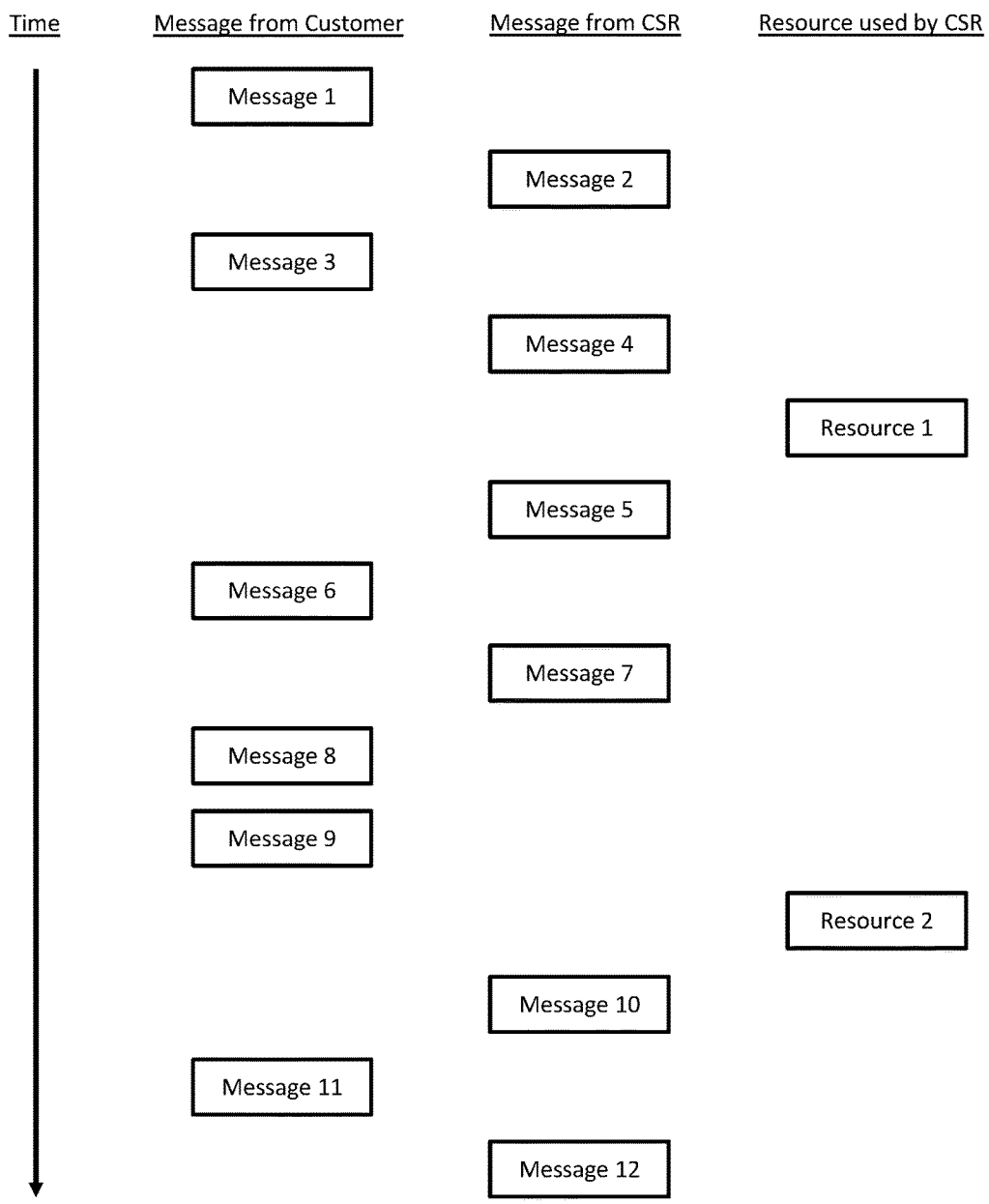
FIG. 4 is an example of data that may be used to train models for suggesting resources.

FIG. 4 illustrates an example of a previous support session between a customer and a CSR that may be included as part of a training corpus for training models. In FIG. 4, time proceeds from the top to the bottom of the figure. The first column of the figure indicates messages sent by the customer to the CSR, the second column indicates messages sent by the CSR to the customer, and the third column indicates resources used by the CSR during the support session (e.g., an image, document, or URL).

In the example of FIG. 4, the first action is a customer sending a message to a CSR for assistance, such as "My Internet is not working. Can you help?" The second message is sent by the CSR to the customer, such as "Hi, my name is John, and I will be helping you today." Similarly, subsequent messages may be sent between the customer and CSR as indicated by messages three through twelve. In this example, the CSR also uses resources in responding to the customer. For example, when sending message 5 to the customer, the CSR may include an image to assist the customer in configuring his router. Similarly, when sending message 10, the CSR may send a URL to the customer to allow the customer to check the speed of his network connection.

Figure 5:
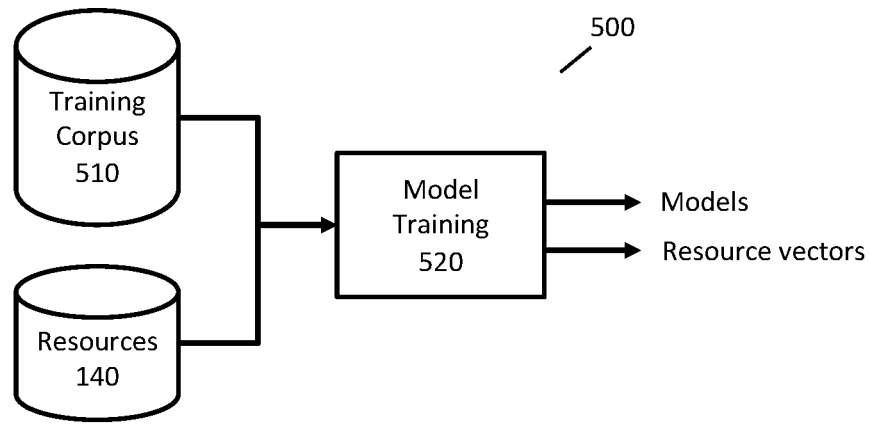
FIG. 5 is an example system for training a model for suggesting resources.

FIG. 5 illustrates a system 500 for training one or models for suggesting resources that may be used by a CSR in a session with a customer. In FIG. 5, training corpus data store 510 may include information about previous sessions between customers and CSRs, such as the session presented in FIG. 4. Training corpus data store 510 may include a large number of sessions, such as tens of thousands or hundreds of thousands of sessions. In FIG. 5, resources data store 140 may include any resources that may be suggested to a CSR. For example, resources data store may include some or all messages previously sent by a CSR to a customer (e.g., messages 2, 4, 5, 7, 10, and 12 from FIG. 4).

Model training component 520 may process training data from training corpus 510 and resources from resources data store 140 to generate one or more mathematical models, such as neural network models, for suggesting resources to a CSR. Model training component 520 may also generate resource vectors for the resources in the data store, where each resource vector describes the resource, such as by indicating a context in which the resource was previously used. The one or more models and resource vectors may be used to select resources as described in greater detail below.

Figure 6:
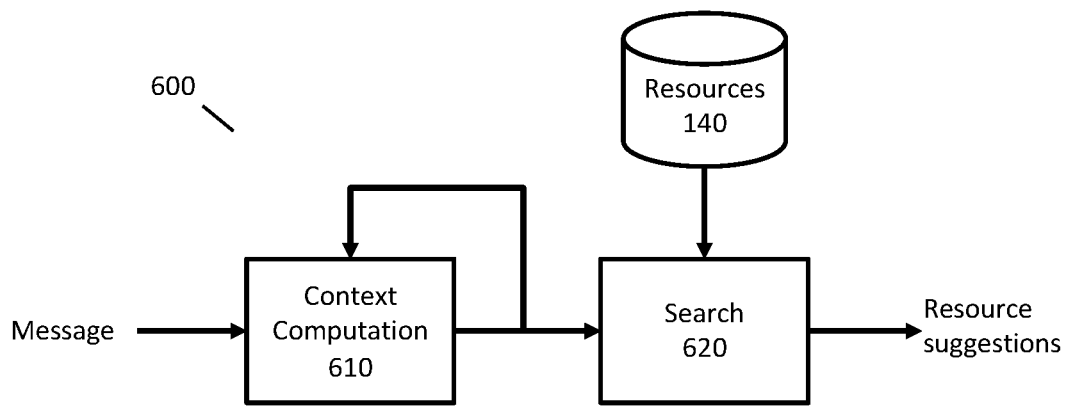
FIG. 6 is an example system for suggesting a resource using a context of a session.

FIG. 6 illustrates a system 600 for suggesting resources to a CSR using the one or models created by system 500 of FIG. 5. In FIG. 6, context computation component 610 receives a message and generates a context vector by processing the message with the one or more models, such as one or more neural network models. In some implementations, context computation component 610 may iteratively process a sequence of messages in a session and generate a context vector after processing each message. For example, context computation component 610 may use a context vector from a previous message in generating a context vector for a current message. Accordingly, each context vector may be computed using a message and a previous context vector.

FIG. 6 includes search component 620 to search for resources using the context vector. In some implementations, search component 620 may query resources data store 140 to obtain resources. For example, search component 620 may obtain resources that have resource vectors that match the context vector or are close to the context vector. Search component 620 may output the retrieved resources, which may then be presented to a CSR.

Figure 7A:
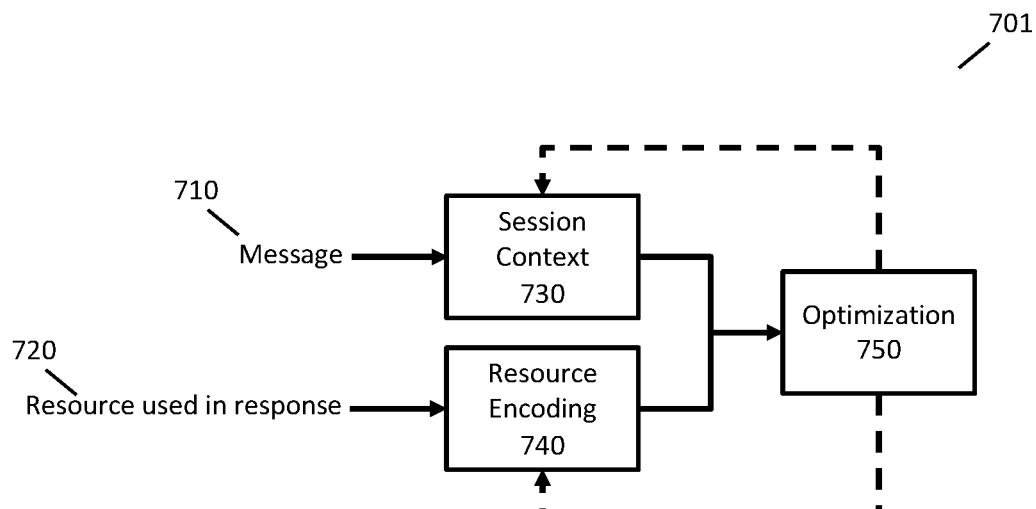
FIGS. 7A and 7B are example systems for training a model for suggesting resources.
Figure 7B:
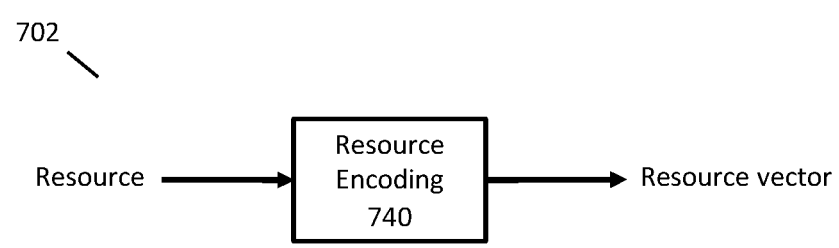

FIGS. 7A and 7B illustrate additional details of an implementation of the system 500 of FIG. 5 for training models for suggesting resources. For example, systems 701 and 702 of FIGS. 7A and 7B may be part of model training component 520 of system 500.

In FIG. 7A, system 701 may train the one or more models using training data, such as the training data of training corpus 510. System 701 may iteratively process pairs of inputs where the pairs of inputs may comprise, for example, a message received from the customer and a resource used in response to the received message by the CSR in the training data. In one iteration, system 701 receives message 710 and resource used in response 720, where resource used in response 720 was used in response to message 710 in the training data. For example, message 710 may be message 1 of FIG. 4 and resource used in response 720 may be message 2 of FIG. 4.

System 701 may process these two inputs and update model parameters, such as model parameters used by session context component 730 and resource encoding component 740. The solid lines in FIG. 7A illustrate data flows for processing training data to determine updated model parameters, and the dashed lines in FIG. 7A illustrate data flows for updating the model parameters in the components of system 701. For example, optimization component 750 may compute updated model parameters and transmit the updated model parameters to other components.

Session context component 730 may process an interaction, such as any of the interactions of FIG. 4, and generate a context vector that describes the session between the customer and the CSR from the beginning of the session through the most recently processed interaction. The context vector may, for example, indicate (not necessarily in a human understandable way) a meaning of the interactions in the session. Any appropriate techniques may be used to compute a context vector, such as any of the techniques described in greater detail below.

Resource encoding component 740 may process the resource that was actually used in response to the message in the training data. Resource encoding component 740 may generate a resource vector that describes the resource (not necessarily in a human understandable way), for example by describing contexts where the resource was previously used by a CSR. Any appropriate techniques may be used to compute a resource vector, such as any of the techniques described in greater detail below.

Optimization component 750 receives the context vector from session context component 730 and the resource vector from resource encoding component 740. Optimization component 750 then determines updated model parameters so that context vector is "closer" to the resource vector in some sense. Because the corresponding resource was actually used at this point of the training data, optimization component 750 determines updated model parameters to increase a similarity between the context vector and the resource vector. The meaning of closeness and similarity with regards to the context and resource vectors may correspond to any mathematical notion of similarity, such as a distance or measure. Because session context component 730 and resource encoding component 740 are trained in parallel, the parameters of these components may converge in parallel so that that the context vector may be used to identify resources (via resource vectors) that are relevant to the current session.

Session context component 730 may iteratively process interactions in a session. For example, session context component 730 may iteratively process some or all of the interactions of FIG. 4 and generate a context vector at each iteration. The interactions processed by session context component 730 may depend on the implementation. In some implementations, session context component 730 may process only messages received from the customer (e.g., messages 1, 3, 6, 8, 9, and 11 of FIG. 4). In some implementations, session context component 730 may process all messages between the customer and the CSR. In some implementations, session context component 730 may process all interactions in the session, including for example, resources used by the CSR (e.g., resources 1 and 2 of FIG. 4) and any other resources described herein.

An example of the process of system 701 is now given using the example training data of FIG. 4. For a first iteration, message 710 may be message 1 of FIG. 4 and resource used in response 720 may be message 2 of FIG. 4. Session context component 730 may compute a context vector for the session although at this point, the session is just message 1 of FIG. 4. Resource encoding component 740 may compute a resource vector, and optimization component 750 may update model parameters.

For a second iteration, session context component 730 may update the context vector by processing message 2 of FIG. 4. During the second iteration, a resource may not be processed since no resource was used at that point in the session. Where no resource is processed, no optimization may be performed as well. In some implementations, the second iteration may not be performed, such as when the context is computed using only messages from the customer.

For a third iteration, message 710 may be message 3 of FIG. 4 and resource used in response 720 may be message 4 of FIG. 4. Session context component 730 may again compute a context for the session and now the context for the session may include messages 1-3 of FIG. 4. As with the first iteration, a resource vector may be computed, and model parameters updated.

For a fourth iteration, message 710 may be message 4 of FIG. 4 and resource used in response 720 may be resource 1 of FIG. 4. Session context component 730 may again compute a context for the session and now the context for the session may include messages 1-4 of FIG. 4. As above, a resource vector may be computed, and model parameters updated.

Subsequent iterations may process the remaining interactions of FIG. 4. After all the interactions of FIG. 4 have been processed, the context vector may be reset to an initial state to prepare for processing another session of training data.

As the model parameters are updated by optimization component 750, the model parameters may be transmitted to session context component 730 and resource encoding component 740 for subsequent processing. In some implementations, the model parameters may be transmitted to the components each time they are updated or they may be transmitted after processing is completed for an entire session of the training data or for multiple sessions of the training data.

The processing described above may be completed for an entire corpus of training data. Each session in the training corpus may be processed one or more times to train the one or more models used by session context component 730 and resource encoding component 740. When the training is complete, as determined by any suitable termination criteria, the trained one or more models may be used for subsequent processing.

FIG. 7B illustrates an example system 702 for computing resource vectors for each resource in resources data store 140 using the one or more models trained by system 701 of FIG. 7A. In FIG. 7B, resource encoding component 740 receives a resource and generates a resource vector for that resource. A resource vector for a resource may be stored in a data store, such as data store 140, in association with the resource to facilitate retrieval of the corresponding resource.

The one or more models and resource vectors may then be used to suggest resources to a CSR. For example, context computation component 610 of system 600 may use the one or models to generate a context vector for a session, and search component 620 may compare the context vector to previously stored resource vectors to retrieve one or more resources as suggestions for a CSR.

Figure 8A:
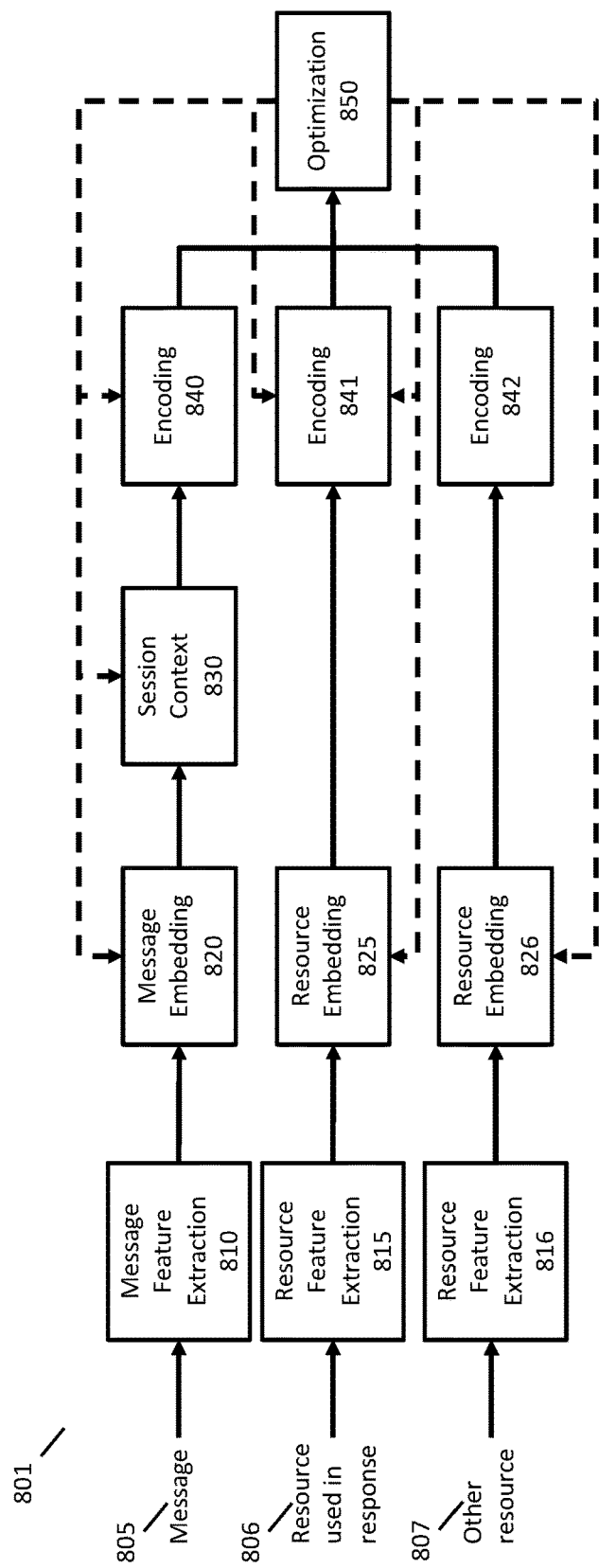

FIGS. 8A, 8B, and 8C, illustrate additional details of an implementation of the systems of FIGS. 7A and 7B for training one or more models for suggesting resources. The examples of FIGS. 8A, 8B, and 8C, are not limiting and many variations of these examples are possible.

In FIG. 8A, system 801 may train the one or more models using training data, such as the training data of FIG. 4. System 801 takes as input message 805 (similar to message 710) and resource used in response 806 (similar to resource used in response 720), where resource used in response 806 was used in response to message 805 in the training data. In addition, system 801 takes as input other resource 807, which may be any other resource, such as a randomly selected resource from resources data store 140. Other resource 807 is used during optimization as described in greater detail below.

In system 801, session context component 830 may compute a context vector similar to the context vector computed by session context component 730. Similarly, optimization component 850 may update parameters of the one or more models similar to the operations of optimization component 750. As with FIG. 7, the solid lines in FIG. 8A illustrate data flows for processing training data to determine updated model parameters, and the dashed lines in FIG. 8A illustrate data flows for updating the model parameters in the components of system 801. Other components of system 801 perform additional processing that are now described.

Message feature extraction component 810 receives message 805 and extracts features from the message. Any appropriate features may be extracted. For example, message feature extraction component 810 may generate a feature vector, where the length of the feature vector is the size of the vocabulary of known words (and possibly n-grams) and each element of the vector indicates a number of times the corresponding word appeared in the message. In another example, feature extraction component 810 may generate a feature matrix, where the number of rows (or columns) in the matrix is equal to the number of words in the message and each row represents the corresponding word as a word embedding (e.g., an N-dimensional vector of real numbers that represents the corresponding word).

Message embedding component 820 receives the features from message feature extraction component 810 and outputs a semantic representation of the message, such as a message embedding. For example, a message embedding may be a fixed-length vector that represents a meaning of the message in an N-dimensional space. Any appropriate techniques may be used to generate the message embedding from the message features. For example, message embedding component 820 may include any unsupervised embedding method (e.g., Word2Vec, GLoVe, SPPMI-SVD), a multi-layer perceptron, or another type of neural network (e.g., a deep averaging, convolution, recurrent, or recursive neural network). In some implementations, message embedding component may receive TFIDF (term frequency, inverse document frequency) features and use a multi-layer perceptron with rectified linear units.

Session context component 830 may receive the message embedding from message embedding component 820 and generate a context vector for the session (e.g., a context vector for the current message and one or more previous messages in the session). Any appropriate techniques may be used to generate a context vector for the session. In some implementations, a context vector may be computed using a neural network, such as a single-layer convolution neural network that processes a linear combination of a fixed-size window of messages or a recurrent neural network (RNN) with long short-term memory units. Now described is an example RNN with long short-term memory units that may be implemented by session context component 830.

Where system 801 is processing a sequence of messages in a session, let $m_t$ represent a message in the session for t from 1 to s, where s is the number of messages in the session so far. For each message, $m_t$, let $x_t$ represent the features for the message as computed by message feature extraction component 810, and let $f(x_t)$ represent the message embedding as computed by message embedding component 820. Let a be the length of a vector representing the message embedding and d be the hidden vector size of the RNN.

In some implementation, session context component 830 may compute a context vector as follows:

$$i_t = \sigma(U_i f(x_t) + V_i y_{t-1})$$
$$o_t = \sigma(U_o f(x_t) + V_o y_{t-1})$$
$$f_t = \sigma(U_f f(x_t) + V_f y_{t-1})$$
$$\tilde{y}_t = \tanh(U_y f(x_t) + V_y t_{t-1})$$
$$\sigma(x)_i = \frac{1}{1 + e^{-x_i}}$$
$$\tanh(x)_i = \frac{e^{x_i} - e^{-x_i}}{e^{x_i} + e^{-x_i}}$$
$$c_t = i_t \odot \tilde{y}_t + f_t \odot c_{t-1}$$
$$y_t = o_t \odot \tanh(c_t)$$

where the $U_i$, $U_o$, $U_f$, $U_y$ are d by a matrices of parameters; the $V_i$, $V_o$, $V_f$, $V_y$ are d by d matrices of parameters; $\odot$ is the element-wise multiplication operator, $y_0$ is initialized as a zero vector; and $c_0$ is initialized as a zero vector. After computing the above, the vector $y_t$ is a context vector that indicates a context of the session after processing message $m_t$.

Encoding component 840 receives the context vector from session context component 830 and outputs an encoded context vector. As explained in greater detail below, the encoded context vector may be referred to as an approximate context hash vector and later processing may compute a context hash vector from the approximate context hash vector.

In some implementations, encoding component 840 may perform a divide-and-encode operation so that the output has a smaller dimension than the input and that the output is an approximately binary vector (many of the elements of the output vector are close to 0 or 1). For example, where the context vector has length d, the encoded context vector may have length k, where d is divisible by k. In some implementations, the encoded context vector may be computed as $$M_t[j] = \tau(\sigma(w_j^T y_t^{(j)}))$$
$$\tau(s) = \begin{cases} 0 & \text{if } s < 0.5 - \epsilon \\ s & \text{if } 0.5 - \epsilon \leq s \leq 0.5 + \epsilon \\ 1 & \text{if } s > 0.5 + \epsilon \end{cases}$$

where $M_t[j]$ indicates the $j^{th}$ element of the vector $M_t$ for j from 1 to k, $w_j$ is a parameter vector of length d/k for j from 1 to k, the superscript (j) means the $j^{th}$ slice of length d/k, and E is a small positive number. The encoded context vector may be represented as $M_t$. In some implementations, encoding component may be implemented using a single layer perceptron with sigmoid units.

Optimization component 850 then receives the encoded context vector and uses it to update model parameters. Optimization component 850 may also take as inputs one or more encoded resource vectors, and optimization component is described in greater detail below following the description of computation of the encoded resource vectors.

System 801 also receives as input resource used in response 806, where resource used in response 806 is the resource that was actually used in response to message 805 in the training data. Resource used in response 806 may be any type of resource described herein, such as a message by a CSR to respond to a customer message or an image used by a CSR in responding to a customer.

Resource feature extraction component 815 receives resource used in response 806 and extracts features from the resource. Any appropriate features may be extracted, and the type of features extracted may depend on a type of the resource. For example, a first type of features may be extracted where the resource is a message and a second type of features may be extracted where the resource is an image. Where the resource is a message, resource feature extraction component 815 may provide the same functionality as message feature extraction component 810. Where the resource is an image, resource feature extraction component 815 may, for example, use pixel values as features or compute SIFT (scale-invariant feature transform), SURF (speeded up robust features), or HOG (histogram of ordered gradients) features.

Resource embedding component 825 receives features from resource extraction component 815 and outputs a semantic representation of the resource, such as resource embedding. For example, a resource embedding may be a fixed-length vector that represents a meaning of the resource in an N-dimensional space. Any appropriate techniques may be used to generate the resource embedding from the resource features, and the type of embedding may depend on a type of the resource. Where the resource is a message, the functionality of resource embedding component 825 may (but need not be) the same as message embedding component. Where the resource is an image, resource embedding component 825 may, for example, embed the image by processing it with a convolution neural network.

Encoding component 841 may receive the resource embedding from resource embedding component 825 and output an encoded resource vector. Encoding component 841 may provide the same functionality as encoding component 840. The encoded resource vector for the resource used in response 806 may be represented as $N_r$.

System 801 also receives as input other resource 807. Other resource 807 may be any other resource in resources data store 140. For example, other resource 807 may be a randomly selected resource from resources data store 140. In some implementations, a type of other resource 807 may be the same type as resource used in response 806 (e.g., if resource used in response 806 is an image, then other resource 807 may be a randomly selected image from resources data store 140). The use of other resource 807 may improve the convergence of the algorithms implemented by optimization component 850.

Resource embedding component 826 may perform the same processing as resource embedding component 825 and encoding component 842 may perform the same processing as encoding component 841. Accordingly, encoding component 842 may output an encoded resource vector for other resource 807, which may be represented as $\tilde{N}_t$.

Accordingly, optimization component may receive encoded message vector $M_t$, encoded resource vector $N_t$ for resource used in response 806, and encoded resource vector $\tilde{N}_t$ for other resource 807. Optimization component 850 may use the encoded context vector and encoded resource vectors to update parameter values for any parameters in system 801, such as parameters used by message embedding component 820, resource embedding component 825, session context component 830, and encoding component 840.

In some implementations, optimization component 850 may update parameter values by using stochastic gradient descent, for example by minimizing a triplet rank loss as a cost function. For example, the triplet rank loss cost function may be represented as $$L = \max(0, 1 + \|M_t - N_t\|_2^2 - \|M_t - \tilde{N}_t\|_2^2)$$

In some implementations, system 801 may receive as input additional resources, such as a second other resource (not shown), where the second other resource may be another randomly selected resource. An encoded resource vector may be computed for the second other resource, and this additional encoded resource vector may be used by optimization component 850 in determining updated parameters.

As above with FIG. 7A, the updated parameters computed by optimization component 850 may be transmitted to other components of system 801. For example, updated parameters may be transmitted after each iteration, after processing an entire session from the training corpus, or after processing multiple sessions from the training corpus.

After system 801 has completed the training process, additional processing may be performed to improve the performance of a system for suggesting resources. Above, the encoded context vector computed by encoding component 840 was referred to as an approximate context hash vector, and the encoded resource vector computed by encoding component 841 was referred to as an approximate resource hash vector. To improve the performance of a system for suggesting resources, a context hash vector may be computed from the approximate context hash vector and a resource hash vector may be computed from an approximate resource hash vector.

A hash vector may provide improved performance in searching for resources over an approximate hash vector. An approximate hash vector may contain real numbers (although many may be close to 0 or 1 as noted above) while a hash vector may contain only boolean values. Performing a search with hash vectors may allow for a quicker search. A hash vector, as used herein, is not limited to storing values in a vector form, and a hash vector may include storing values as a matrix or tensor as the techniques described herein are not limited to any precise arrangement of hash values.

FIGS. 8B and 8C illustrate exemplary systems for creating hash vectors from approximate hash vectors.

FIG. 8B illustrates a system 802 for generating an approximate resource hash vector for resources, such as each of the resources in resources data store 140. In FIG. 8B, each of the components may have the same implementation as the corresponding components of FIG. 8A. For each resource being processed, features may be computed by resource feature extraction component 815, a resource embedding may be computed by resource embedding component 825, and an approximate resource hash vector (also called an encoded resource vector) may be computed by encoding component 840. Accordingly, an approximate resource hash vector may be computed for each resource.

FIG. 8C illustrates a system 803 for training a quantization model for computing hash vectors from approximate hash vectors. In FIG. 8C, quantization model training component 860 receives as input all of the approximate resource hash vectors computed by system 802. Quantization model training component 860 then generates a model that allows approximate hash vectors to be converted to hash vectors. For example, a quantization model may implement a rotation.

In some implementations, quantization model training component 860 may be implemented as follows. A matrix $\mathcal{N}$ may be created where each row of the matrix $\mathcal{N}$ is an approximate resource hash vector. This matrix $\mathcal{N}$ may then be average-centered. An average row vector may be computed as $$\mu = \frac{1}{n}\sum_{i=1}^{n}\mathcal{N}_i,$$

where n is the number of rows and $\mathcal{N}_i$ is the $i^{th}$ row of $\mathcal{N}$. The matrix $\mathcal{N}$ may then be average-centered by subtracting the average row vector from each row of the matrix $\mathcal{N}$.

The average-centered matrix $\mathcal{N}$ may then be used train a rotation matrix R for generating hash vectors. The rotation matrix may be initialized, such as by initializing it to a random rotation. The rotation matrix may then be trained by sequentially performing the following updates:

$$B = \text{sign}(\mathcal{N}R)$$

$$U, S, V = SVD(B^T\mathcal{N})$$

$$R = VU^T$$

where signs( ) returns matrix of 1's and −1's according to the sign of corresponding elements of the input and SVD( ) performs a singular value decomposition of the input. This sequence of operations may be performed until a convergence criterion has been met. Each row of the final matrix B contains a resource hash vector for a corresponding resource and the final matrix B may have values of only 1 and −1. In some implementations, the matrix B may be converted to a matrix of 1s and 0s by converting all the −1s to 0s or performing some other similar operation. The quantization model comprises rotating a vector with rotation matrix R and then performing the sign( ) operation on the resulting vector.

Figure 9A:
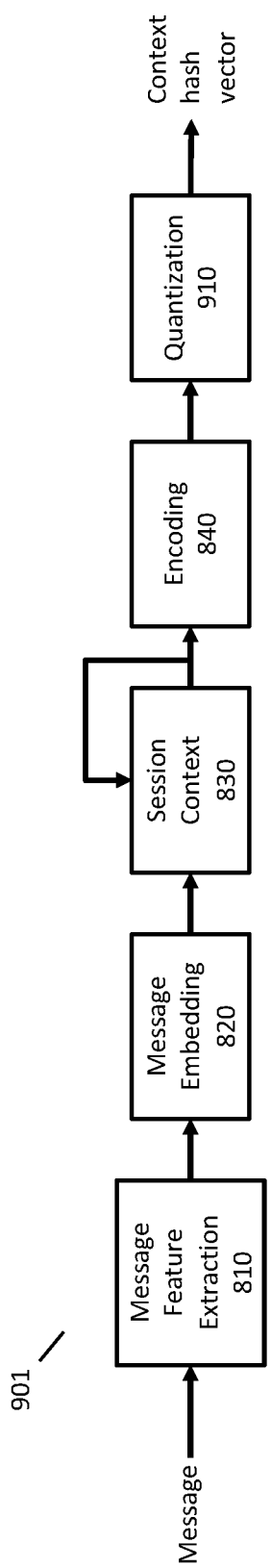
FIGS. 9A and 9B are example systems for suggesting a resource using hash vectors.
Figure 9B:
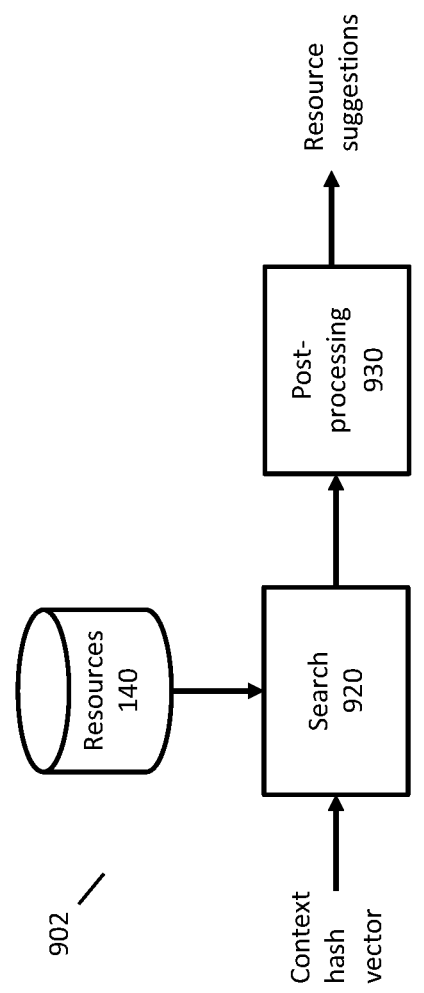

FIGS. 9A and 9B illustrate systems for suggesting a resource to a CSR using hash vectors. At the beginning of a session with a CSR a first message is received. The first message may be from either the customer or the CSR. The received message is processed to compute a context hash vector, and then the context hash vector is used to retrieve resources from resources data store 140.

In system 901 of FIG. 9A, message feature extraction component 810 computes features for the message, message embedding component 820 computes a message embedding from the features, session context 830 computes a context vector for the session (which may include only the first message at this point), encoding component 840 computes an approximate context hash vector, and quantization component 910 computes a context hash vector. Quantization component 910 may receive the approximate context hash vector (which may have real values) and may perform a rotation and then compute the sign( ) of the rotated vector to generate the context hash vector (which may have values of only 1 and −1). In some implementations, the context hash vector may be converted to a vector of 1s and 0s similar to the processing of the resource hash vectors above.

In system 902, the context hash vector is used to obtain resources to suggest to a CSR. Search component 920 receives a context hash vector and retrieves resources from a resources data store 140 by comparing the context hash vector to resource hash vectors in the data store.

In some implementations, search component 920 may retrieve all resources where the resource hash vector of the resource is equal to the context hash vector by performing a query using the context hash vector.

In some implementations, search component 920 may retrieve all resources where the resource hash vector of the resource is within a Hamming radius of the context hash vector. A Hamming radius of a hash vector may comprise all other vectors where the number of different elements is less than or equal to a specified value. A Hamming radius of 1 for a context hash vector would include a resource hash vector that is identical to the context hash vector and all resource hash vectors whose elements are the same as the context hash vector for all but one element. For example, for a context hash vector of [1, 0, 1, 0], resource hash vectors within a Hamming distance of 1 would include [1, 0, 1, 0]; [0, 0, 1, 0]; [1, 1, 1, 0]; [1, 0, 0, 0]; and [1, 0, 1, 1]. Search component 920 may determine all resource hash vectors within a Hamming radius of the context hash vector and retrieve corresponding resources from resources data store 140.

In some implementations, search component 920 may implement an inverted index to speed up retrieval of resources using a context hash vector. An inverted index may include a list of resources corresponding to each possible resource hash vector, and allow for fast retrieval of resources from resources data store 140.

In some implementations, system 902 may include post-processing component 930. Post-processing component 930 may receive a list of resources from search component 920 and perform additional processing to determine which resources to present to a CSR. Post-processing component 930 may rerank the resources received from search component 920 or may select no resources so that no suggestions are presented to a CSR. In some implementations, post-processing component 930 may use a translation language model that was trained to translate between messages and resources used in response to messages; may apply any statistical machine translation techniques that indicate a match between a message and a resource, may use a ranking support vector machine that processes TFIDF features of a previous message, or may use any other known reranking techniques.

The resource suggestions may then be presented to a CSR, such as by presenting information about the suggested resources in a user interface, such as the user interface of FIG. 2. The CSR may then use the suggested resources in a conversation with the customer. For example, where the suggested resource is a message, the CSR may send that message to the customer or may modify it and then send it to the customer.

Figure 10:
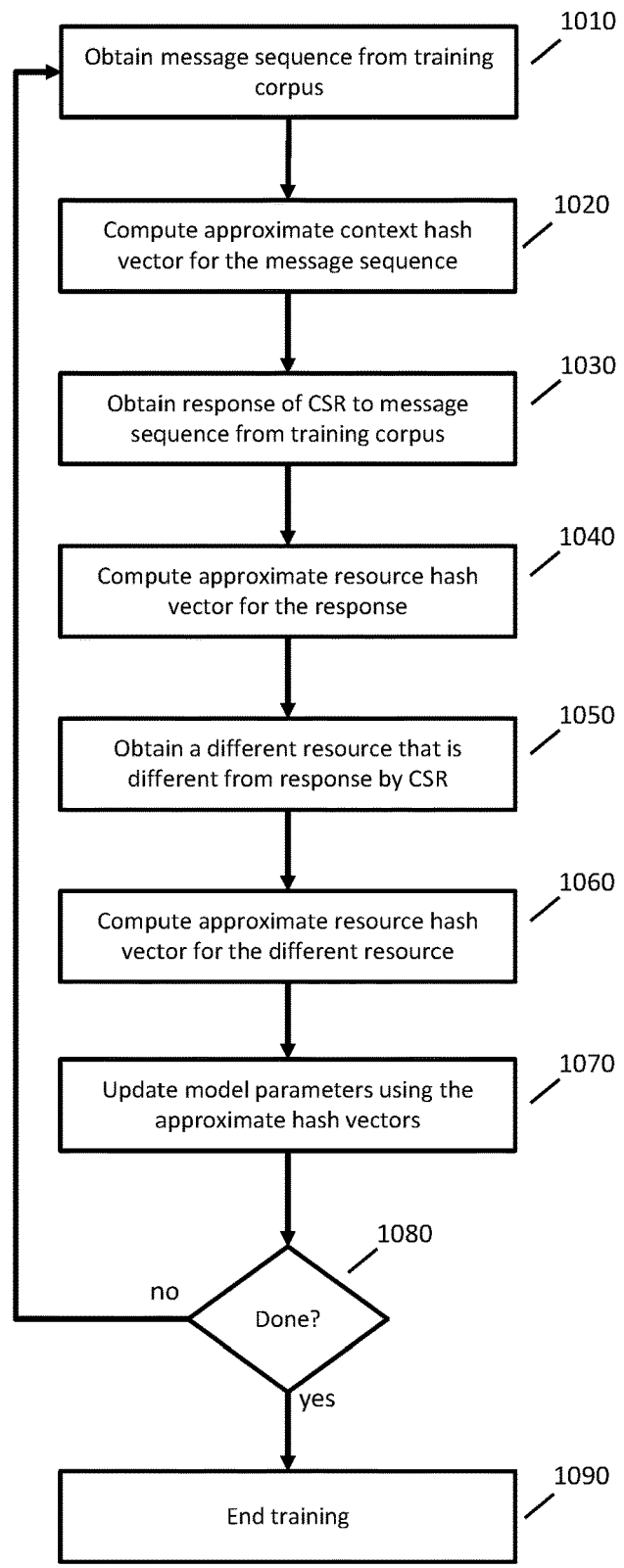
FIG. 10 is a flowchart for an example implementation of training a model for suggesting resources using hash vectors.

FIG. 10 is a flowchart of an example implementation of training one or more models for computing hash vectors for suggesting resources. In FIG. 10, the ordering of the steps is exemplary and other orders are possible, not all steps are required and, in some implementations, some steps may be omitted or other steps may be added. The process of the flowcharts may be implemented, for example, by any of the computers or systems described herein.

At step 1010, a message sequence is obtained from a training corpus, such as the message sequence of FIG. 4 or a portion of the message sequence of FIG. 4. The message sequence may include any number of messages between a customer and a CSR. The message sequence may also include other information, such as other resources used by a CSR during the session between the customer and the CSR. For example, the message sequence may be messages 1-3 of FIG. 4.

At step 1020, an approximate context hash vector is computed for the message sequence. The approximate context hash vector may be computed using any of the techniques described above. For example, an approximate context hash vector may be computed iteratively for each message in the sequence, where each approximate context hash vector is computed using the approximate context hash vector from the previous iteration. Computing the approximate context hash vector may also include processing other resources used by a CSR, such as when the CSR uses an image in responding to the customer. In some implementations, an approximate context hash vector may be computed by message feature extraction component 810, message embedding component 820, session context component 830, and encoding component 840.

At step 1030, a response of the CSR to the last message in the message sequence is obtained from the training data. For example, the response of the CSR may be message 4 of FIG. 4.

At step 1040, an approximate resource hash vector is computed for the response. The approximate resource hash vector may be computed using any of the techniques described above. In some implementations, an approximate resource hash vector for the response may be computed by resource feature extraction component 815, resource embedding component 825, and encoding component 841.

At step 1050, a different resource is obtained that is different from the response of the CSR to customer at step 1040. For example, a resource may be selected randomly from resources data store 140.

At step 1060, an approximate resource hash vector is computed for the different resource obtained at step 1050. The approximate resource hash vector for the different resource may be computed using any of the techniques described above. In some implementations, approximate resource hash vector for the different resource may be computed by resource feature extraction component 816, resource embedding component 826, and encoding component 842.

In some implementations, multiple different resources may be used as described above. Accordingly, steps 1050 and 1060 may be performed for each different resource that is used.

At step 1070, model parameters are updated using the approximate context hash vector, the approximate resource hash vector for the response of the CSR, and one or more approximate resource hash vectors for the different resources. The model parameters may be updated using any of the techniques described herein.

At step 1080, it is determined whether the training process has completed. Any appropriate criteria may be used to determined when the training process has completed. For example, where the model parameters have converged to stable values (e.g., the differences with a previous iteration are small), it may be determined that the training has completed. Where training has not completed, processing may return to step 1010 to, for example, obtain and process the following message in a message sequence.

At step 1090, training is completed and the trained one or more models may be further processed (e.g., compute approximate resource hash vectors, train a quantization model, and compute resource hash vectors) and used for suggesting resources.

Figure 11:
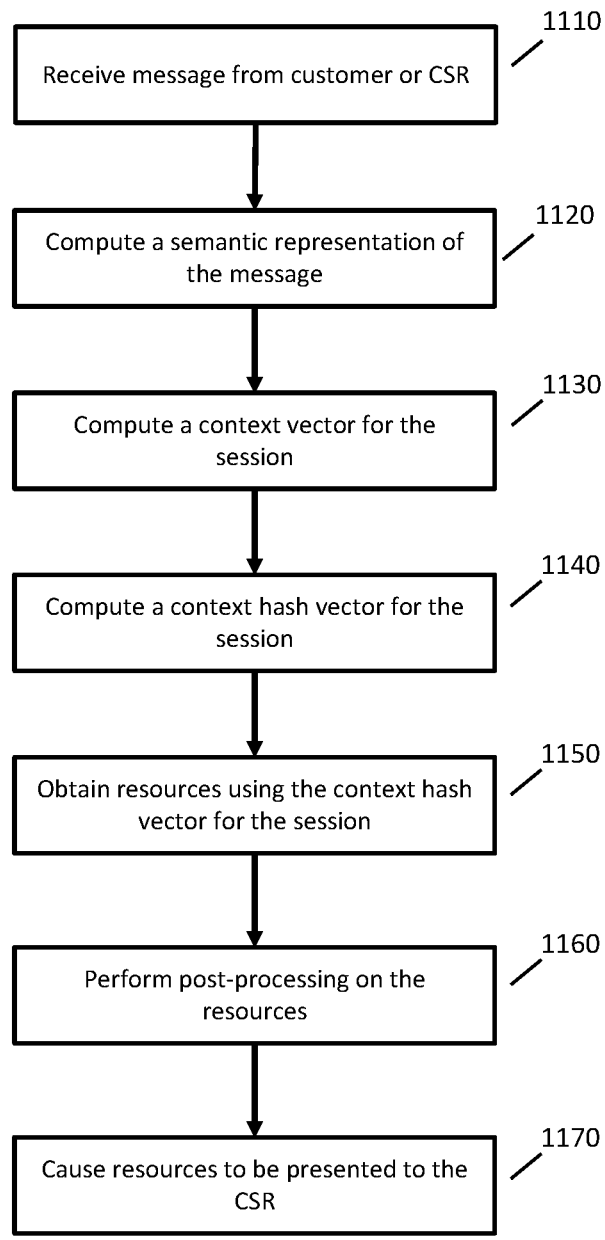
FIG. 11 is a flowchart of an example implementation of suggesting a resource using hash vectors.

FIG. 11 is a flowchart of an example implementation of suggesting resources using hash vectors. In FIG. 11, the ordering of the steps is exemplary and other orders are possible, not all steps are required and, in some implementations, some steps may be omitted or other steps may be added. The process of the flowcharts may be implemented, for example, by any of the computers or systems described herein.

At step 1110, a message is received from either a customer or a CSR. For example, the message may be sent from a customer to the CSR or from the CSR to the customer. The message may be the first message between them or it may follow other messages between them.

At step 1120, a semantic representation is computed from the message. The semantic representation may be any representation of the message that indicates a meaning of the message, although the semantic representation may not be understandable by a person. The semantic representation may be a vector of real numbers or may take another form, such as a matrix or a tensor. In some implementations, the semantic representation may be a message embedding computed by message feature extraction component 810 and message embedding component 820.

At step 1130, a context vector is computed for the session using the semantic representation of the message. The context vector may be any representation of the session that indicates a meaning of the session (for example, the meaning of the session may include a meaning of the current message and a meaning of previous messages in the session). The context vector may be computed using a context vector from a previous iteration that processed a previous message in the session. The context vector may be a vector of real numbers or may be in another format, such as a matrix or a tensor (the term context vector is used for clarity of presentation but a context matrix or context tensor may be computed instead). In some implementations, the context vector may be computed using session context component 830.

At step 1140, a context hash vector is computed for the session. The context hash vector may be any hash vector that indicates a meaning of the session (for example, the meaning of the session may include a meaning of the current message and a meaning of previous messages in the session). The context hash vector may be a vector where each element of the vector takes one of two values, such as 0 or 1. In some implementations, a context hash matrix or a context hash tensor may be computed instead of a context hash vector. In some implementations, the context hash vector may be computed using encoding component 840 and quantization component 910.

At step 1150, one or more resources are obtained using the context hash vector. For example, one or more resources may be retrieved from a data store of resources where a resource hash vector of a resource matches or is close to the context hash vector. In some implementations, resources may be obtained where the resource hash vectors are within a Hamming distance of the context hash vector. In some implementations, the one or more resources may be obtained by search component 920.

At step 1160, post-processing may be performed on the obtained resources as described above. In some implementations, the post-processing may be performed by post-processing component 930.

At step 1170, one or more resources are caused to be presented to the CSR. For example, the one or more resources may be presented to the CSR using the user interface of FIG. 2. The CSR may then use the resource in responding to the customer as described above.

Figure 12:
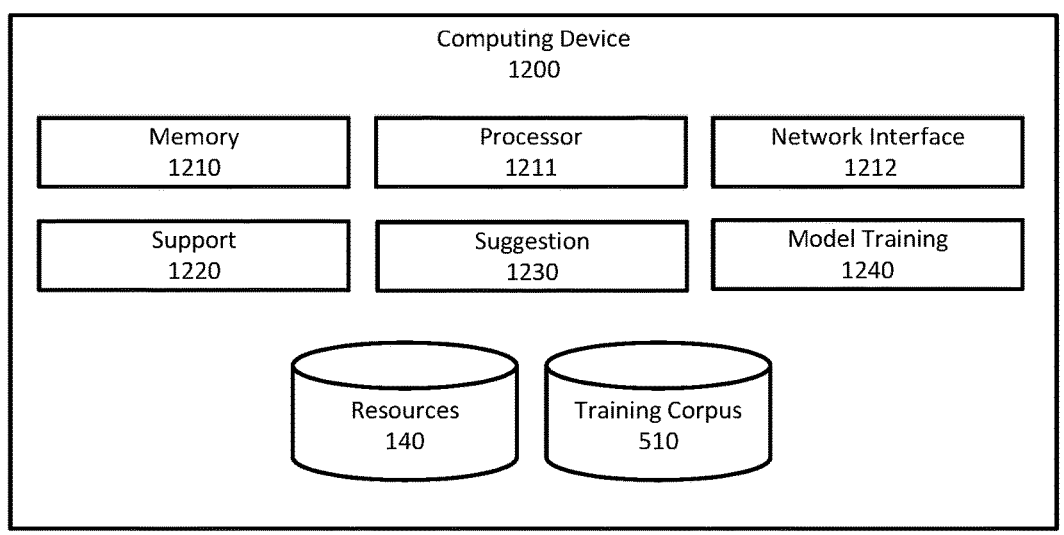
FIG. 12 is an exemplary computing device that may be used to suggest resources and train models for suggesting resources.

FIG. 12 illustrates components of one implementation of a computing device 1200 for implementing any of the techniques described above. In FIG. 12, the components are shown as being on a single computing device 1200, but the components may be distributed among multiple computing devices, such as a system of computing devices, including, for example, an end-user computing device (e.g., a smart phone or a tablet) and/or a server computing device (e.g., cloud computing).

Computing device 1200 may include any components typical of a computing device, such as volatile or nonvolatile memory 1210, one or more processors 1211, and one or more network interfaces 1212. Computing device 1200 may also include any input and output components, such as displays, keyboards, and touch screens. Computing device 1200 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1200 may have a support component 1220 that provides functionality for allowing a customer and a CSR to interact with each other in a support session, such as presenting user interfaces to a customer or CSR, allowing messages to be transmitted between the customer and the CSR, or presenting suggestions to a CSR. Computing device 1200 may have a suggestion component 1230 that may identify resources as possible suggestions for a CSR, such as by processing a message transmitted between a customer and a CSR, computing a context for the session, and retrieving resources from a data store using the computed context. Computing device 1200 may have a model training component 1240 that train mathematical models, such as artificial neural networks, for suggesting resources based on a context of a session.

Computing device 1200 may include or have access to various data stores, such as data stores 140 and 510. Data stores may use any known storage technology, such as files or relational or non-relational databases. For example, computing device 1200 may have a resources data store 140 and a training corpus data store 510, as described above.

For clarity of presentation, the techniques described above have been presented in the context of a session between a customer and a CSR where the customer and CSR are exchanging messages with each other. The techniques described above, however, are not limited to that particular example, and other applications are possible.

The techniques described above may be applied to any two entities exchanging messages with each other. For example, two individuals may be exchanging messages with each other, resources may be suggested to either user, and the suggested resources may include a message to send in response or something else, such as a URL to a website with information relevant to the conversation.

The techniques described above may be applied to interactions other than messages. For example, the interactions between two entities may be in the form of audio and/or video and resources may be suggested to the entities by processing the audio and/or video to determine a context of the session and suggest resources to the entities.

The techniques described above may be applied to interactions that proceed in non-linear ways, such as a directed acyclic graph (in comparison to linear, sequential exchanges in a messaging session). For interactions that proceed as a directed acyclic graph, a recursive neural network (e.g., with long short-term memory units) may be used that is adapted to process nodes of a directed acyclic graph.

The techniques described above may be combined with any of the techniques described in U.S. patent application Ser. No. 15/254,008 filed on Sep. 1, 2016, now issued as U.S. Pat. No. 9,715,496 on Jul. 25, 2017, and U.S. patent application Ser. No. 15/383,707, filed on Dec. 19, 2016 and entitled "Word Hash Language Model", each of which is herein incorporated by reference in its entirety for all purposes. For example, any of the techniques described herein may be provided as part of a third-party semantic processing service whereby a third party provides semantic processing services to a company to assist the company in providing customer service to its customers.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for presenting information about a resource to a user, the method performed by one or more server computers and comprising:
   receiving a plurality of electronic messages during a session between a first computing device of a first user and a second computing device of a second user;
   computing a message embedding for each message of the plurality of electronic messages with a first neural network, wherein each message embedding represents a corresponding message in a vector space;
   computing a first context vector by sequentially processing the message embeddings for the plurality of electronic messages, wherein the processing is performed using a second neural network;
   quantizing the first context vector to obtain a first context hash vector;
   selecting a first resource from a data store using the first context hash vector and a hash vector for the first resource, wherein (i) the data store comprises a plurality of resources, (ii) each resource of the plurality of resources is associated with a hash vector, (iii) selecting the first resource comprises computing a distance between the first context hash vector and the hash vector for the first resource; and
   transmitting, during the session, information about the first resource to the first computing device to allow the first user to access the first resource.

2. The computer-implemented method of claim 1, wherein the first user is a customer service representative and the second user is a customer.

3. The computer-implemented method of claim 1, wherein the method further comprises:
   receiving a subsequent message between the first user and the second user;
   computing a subsequent message embedding for the subsequent message;
   computing a second context vector using the first context vector and the subsequent message embedding of the subsequent message;
   quantizing the second context vector to obtain a second context hash vector;
   selecting a second resource from the data store using the second context hash vector and a hash vector for the second resource; and
   transmitting, during the session, information about the second resource to the first computing device.

4. The computer-implemented method of claim 1, wherein the second neural network is a recurrent neural network or a convolution neural network.

5. The computer-implemented method of claim 1, wherein each element of the first context hash vector comprises a boolean value.

6. The computer-implemented method of claim 1, wherein the first resource comprises text of a message, a document, an image, or a URL.

7. The computer-implemented method of claim 1, wherein the first context hash vector is equal to the hash vector for the first resource.

8. The computer-implemented method of claim 1, wherein the distance is a Hamming distance.

9. A system for presenting information about a resource to a user, the system comprising:
   at least one server computer comprising at least one processor and at least one memory,
   the at least one server computer configured to:
     receive, a plurality of electronic messages during a session between a first computing device of a first user and a second computing device of a second user;
     compute, a semantic representation of each message of the plurality of electronic messages;
     compute, a first context vector by processing the semantic representations for the plurality of electronic messages;
     quantize, the first context vector to obtain a first context hash vector;
     select a first resource from a data store using the first context hash vector and a hash vector for the first resource, wherein the data store comprises a plurality of resources and each resource of the plurality of resources is associated with a hash vector; and
     transmit, during the session, information about the first resource to the first computing device.

10. The system of claim 9, wherein the at least one server computer is configured to:
    receive a selection of the first resource by the first user; and cause the first resource to be transmitted to the second user.

11. The system of claim 9, wherein the semantic representation comprises a message embedding.

12. The system of claim 9, wherein the at least one server computer is configured to compute the first context vector using a recurrent neural network with long short-term memory units.

13. The system of claim 9, wherein the at least one server computer is configured to select the first resource using an inverted index.

14. The system of claim 9, wherein the at least one server computer is configured to quantize the first context vector by performing a rotation of the first context vector.

15. The system of claim 9, wherein the first context vector is computed using a neural network and the neural network is trained by minimizing a triplet rank loss function.

16. One or more non-transitory computer-readable media comprising computer executable instructions that, when executed, cause at least one processor to perform actions comprising:
   receiving a plurality of electronic messages during a session between a first computing device of a first user and a second computing device of a second user;
   computing a semantic representation of each message of the plurality of electronic messages;
   computing a context vector by processing the semantic representations for the plurality of electronic messages;
   quantizing the context vector to obtain a context hash vector;
   selecting a first resource from a data store using the context hash vector and a hash vector for the first resource, wherein the data store comprises a plurality of resources and each resource of the plurality of resources is associated with a hash vector; and
   transmitting, during the session, information about the first resource to the first computing device.

17. The one or more non-transitory computer-readable media of claim 16, wherein each element of the context hash vector comprises a boolean value.

18. The one or more non-transitory computer-readable media of claim 16, wherein selecting the first resource from the data store comprises computing a Hamming distance between the context hash vector and the hash vector for the first resource.

19. The one or more non-transitory computer-readable media of claim 16, wherein the semantic representation comprises a message embedding.

20. The one or more non-transitory computer-readable media of claim 16, wherein selecting the first resource comprises using an inverted index.

* * * * *

UNITED STATES PATENT AND TRADEMARK OFFICE
CERTIFICATE OF CORRECTION

PATENT NO. : 10,650,311 B2
APPLICATION NO. : 15/383603
DATED : May 12, 2020
INVENTOR(S) : Shawn Henry It is certified that error appears in the above-identified patent and that said Letters Patent is hereby corrected as shown below:

On the Title Page

Item (73), in Column 1, in "Assignee", Line 1, delete "ASAAP, INC.," and insert -- ASAPP, INC., --, therefor.

On the Page 2, in Column 1, under "Other Publications", Line 8, delete "-learrn.org/" and insert -- -learn.org/ --, therefor.

On the Page 2, in Column 2, under "Other Publications", Line 27, delete "-effectiveness!," and insert -- -effectiveness/, --, therefor.

On the Page 2, in Column 2, under "Other Publications", Line 41, delete "Leaning_" and insert -- Learning_ --, therefor.

In the Specification

In Column 10, Line 14, delete "E" and insert -- $\epsilon$ --, therefor.

In Column 12, Line 55, delete "signs( )" and insert -- sign( ) --, therefor.

Signed and Sealed this
Fourteenth Day of July, 2020

Andrei Iancu
*Director of the United States Patent and Trademark Office*